July 27, 1965  W. E. FERRELL ETAL  3,196,617
MASTER CYLINDER CAP
Filed April 12, 1963  2 Sheets-Sheet 1
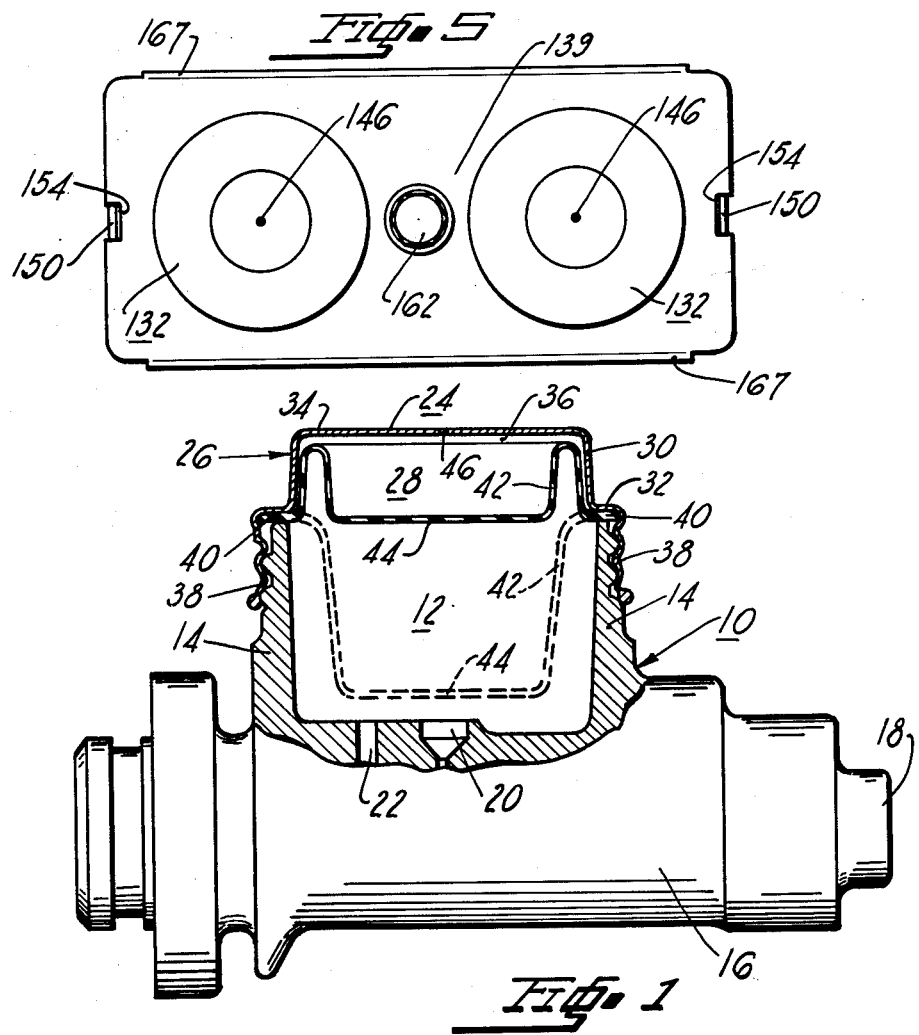
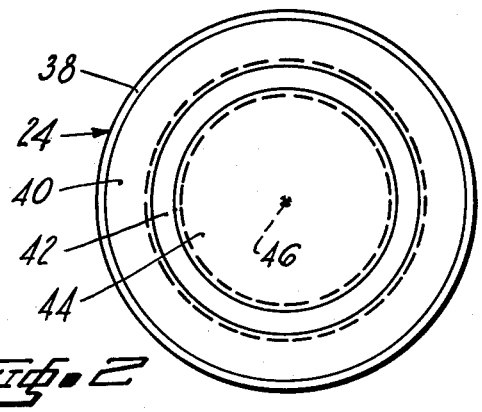
WILLIAM E. FERRELL
PAUL B. SHUTT
GEORGE W. SHAFER
KYLE E. MCAFEE
INVENTORS
BY Sheldon F. Raizer
ATTORNEY July 27, 1965 W. E. FERRELL ETAL 3,196,617
MASTER CYLINDER CAP
Filed April 12, 1963 2 Sheets-Sheet 2
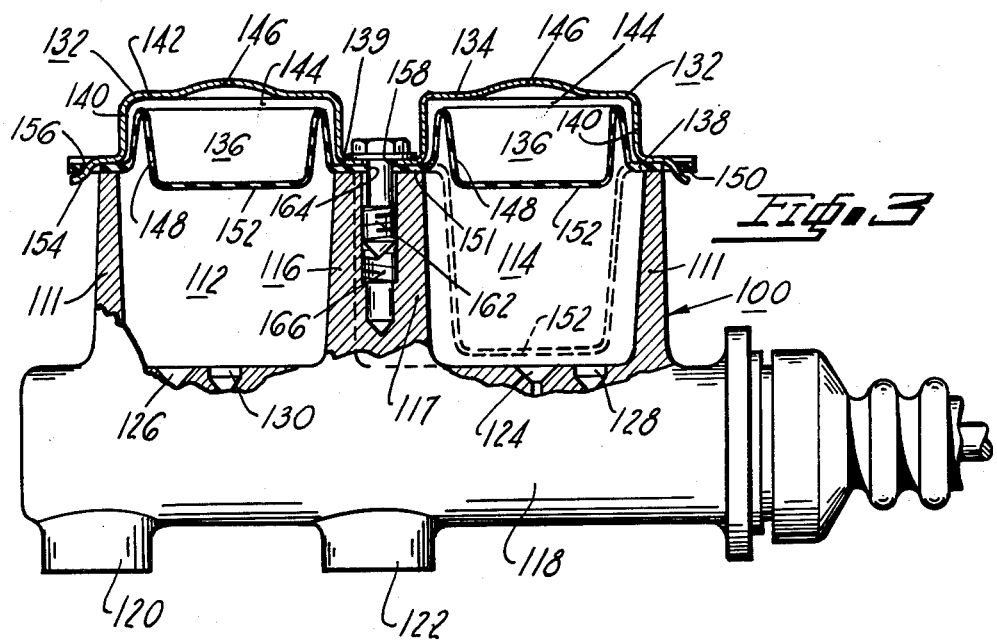
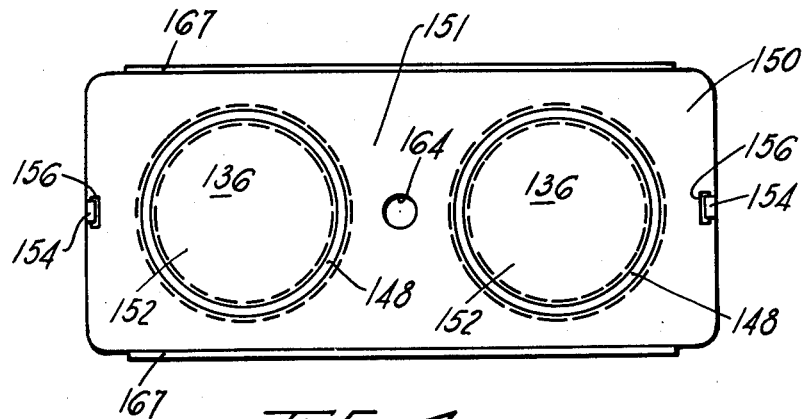
WILLIAM E. FERRELL
PAUL B. SHUTT
GEORGE W. SHAFER
KYLE E. McAFEE
INVENTORS
BY Sheldon L. Raizen
ATTORNEY United States Patent Office
3,196,617
Patented July 27, 1965

3,196,617
MASTER CYLINDER CAP
William E. Ferrell, Paul B. Shutt, and George W. Shafer, St. Joseph, Mich., and Kyle E. McAfee, Grafton, Ohio, assignors to The Bendix Corporation, St. Joseph, Mich., a corporation of Delaware
Filed Apr. 12, 1963, Ser. No. 272,731
4 Claims. (Cl. 60—54.6)

This invention concerns a cap for use with a master cylinder.

An object of this invention is to provide a master cylinder, having a reservoir, with a cap which seals the reservoir from outside contaminates.

Another object of the invention is to provide a master cylinder, having a reservoir, with a cap which seals the reservoir from outside contaminates and has a flexible element to fill the void created by brake fluid leaving the reservoir.

Further objects of the invention will become apparent to those skilled in the art from the following description with reference to the drawings wherein:

FIGURE 1 is a view of a master cylinder and cap assembly with the cap and reservoir of the master cylinder being illustrated in section;

FIGURE 2 is a bottom view of the cap of FIGURE 1;

FIGURE 3 is a view of another embodiment of the invention illustrating a split system master cylinder and cap assembly with the cap and reservoir of the master cylinder being illustrated in section;

FIGURE 4 is a bottom view of the cap of FIGURE 3; and

FIGURE 5 is a top view of the cap of FIGURE 3.

Referring to FIGURES 1 and 2, there is illustrated a master cylinder housing 10 comprising a reservoir 12 defined by an annular wall 14.

A longitudinal portion 16 of the master cylinder has a longitudinal bore and a plunger (not shown) slidably mounted therein. An outlet port 18 may be communicated to a plurality of wheel cylinders of a brake and a compensating port 20 and a replenishing port 22 communicate the reservoir 12 with the fluid chamber of the longitudinal bore. The plunger construction within the longitudinal housing 16 may be of any well known construction.

The master cylinder 10 is provided with a round cap 24 comprising a cover member 26 and a sealing member 28. The cover member 26 comprises an annular wall 30 extending upwardly from an annular flange 32, and a top plate 34 integral with the annular wall 30 to define a cup shaped cavity 36 therein. An annular threaded flange 38 extends from the flange 32 for the purpose of threadedly securing the cap to the wall 14 of the reservoir 12. The sealing member 28, preferably of rubber, bridges the entire cavity 36 and comprises an annular main base portion 40 and a flexible element comprising an annular U-shaped portion 42 integral with the main base portion 40 and integral with a disc-shaped portion 44. The disc-shaped portion 44 is co-planar with the main base portion 40 and spaced therefrom by an annular recess defined by the U-shaped portion 42. The flexible element is made of thinner rubber material than that of the base portion 40. A vent 46 is provided in the top member 26 for communicating the cavity 36 to the atmosphere.

When the cap is secured to the reservoir 12, the bottom surface of the flange 32 will bear against the top surface of the main base portion 40 to press the same against the end surface of the reservoir wall 14, thereby sealing the reservoir 12 from the cavity 36 and from the atmosphere and thus is free from outside contaminates. Upon brake fluid leaving the reservoir 36, the flexible element 42, 44 will move into the chamber to fill the void created by brake fluid leaving the reservoir. This is accomplished by the deformation of the U-shaped portion 42 as shown in the dotted line position. Of course, the position of the disc-shaped portion 44 will depend upon the amount of fluid loss from the reservoir 12.

Referring to the embodiment of FIGURE 3, there is shown a split system master cylinder 100 comprising a reservoir defined by a rectangularly shaped peripheral wall 111. The reservoir is separated into two fluid chambers 112, 114 by an inner wall 116 and a boss 117 integral with the wall 116. A longitudinal portion 118 of the master cylinder has a longitudinal bore with a pair of pressure producing plungers (not shown) slidably mounted therein. Outlet ports 120, 122 may be each communicated to a pair of wheel cylinders and the compensating ports 124, 126 and replenishing ports 128, 130 communicate reservoir fluid chambers 112 and 114 with their respective fluid chambers of the longitudinal bore. The plunger construction within the longitudinal housing may be of the same construction which is disclosed in copending applications U.S. Serial No. 49,765, filed August 15, 1960, now Patent Number 3,149,468, or U.S. Serial No. 115,406, filed June 7, 1961 (common assignee) and now abandoned.

The master cylinder 100 is provided with a rectangularly shaped cap 132 comprising a cover member 134 and a sealing member 136. The cover member 134 comprises a flat base portion 138 which has a pair of spaced annular walls 140 extending upwardly therefrom and a pair of top plates 142 integral with a respective annular wall 140. Each annular wall 140 and top plate 142 provides a cup-shaped cavity 144. A vent 146 is provided in the top member 134 to communicate the cavity to atmosphere. The sealing member 136, preferably of rubber, bridges each of the cavities 144 and the whole cover member and is rectangularly shaped. The sealing member 136 has a pair of flexible elements, one for each fluid chamber, each of which comprises an annular U-shaped portion 148 which extends into the cavity 144 and is integral with the main base portion 150 of the sealing member and integral with a disc-shaped portion 152 which is spaced from the main base portion 150 by an annular recess defined by the U-shaped portion 148. The flexible elements are of thinner rubber material than the main base portion 150. A pair of detents 154 extend from the cover member 134 and pass through a respective slot 156 of the sealing member to retain the sealing member with the cover member.

The cover member 134 has an oversize opening 158 in the central portion 139 of the base 138 for receiving a bolt 162. The bolt 162 extends through an opening 164 in the central portion 151 of the main base portion 150 of the sealing member 136 and into the threaded opening 166 of the boss 117. The bolt 162 has an interference fit with the opening 164 of the sealing member 136 for the purpose of retaining the bolt with the cap when the cap is removed from the master cylinder. A pair of parallel depending flanges 167 serve as a locator for the cap on the reservoir and also as a stiffening member for the cap.

When the cap is secured to the reservoir by screwing the bolt 162 in the threaded opening 166, the cover member will press the main base portion 150 of the sealing member 136 into engagement with the end surfaces of the walls of the reservoir thus sealing the reservoir from the atmosphere. Upon brake fluid leaving the fluid chambers 112, 114 the flexible elements will move into their respective chambers to fill the void created by the brake fluid leaving the fluid chambers. This is accomplished by the deformation of the U-shaped portion 148 as shown in the dotted line position in chamber 114. Of course, the position of the disc-shaped portion 152 will depend upon the amount of fluid loss from the respective fluid chamber.

The embodiment of FIGURE 1 illustrates the disc-shaped portion 44 co-planar with the main base portion 40 of the sealing member and the embodiment of FIGURE 3 illustrates the disc-shaped portion 152 being lower than the main base portion 150 of the sealing member 136. Obviously, the disc-shaped portion of the sealing member may or may not be co-planar with the main base portion of the sealing member in either embodiment, but it is important that the U-shaped portions 42 or 148 always be located in the cavity defined by the cover members and the disc-shaped portion 152 be located as far up in the reservoir as possible so that it will be possible to store a sufficient supply of brake fluid in the reservoir.

Although this invention has been illustrated and described in connection with specific embodiments, numerous other adaptations will become apparent to those skilled in the art from the description in conjunction with the accompanying claims whereby the same or substantially the same results may be obtained.

Having thus described the features of the invention, what we claim as new and desire to secure by Letters Patent is:

1. The combination of a master cylinder and a cap therefor comprising: said master cylinder having a reservoir comprising an annular wall open at the upper end thereof, a bore located at the lower end of said reservoir, the axis of said bore extending normal to the axis of said reservoir, fluid pressure generating means located in said bore, and port means communicating said reservoir with said bore; said cap comprising a cover member comprising an annular wall portion closed at the top end by a transverse portion and open at the bottom end thereby defining a generally cup-shaped cavity therein, breather port means in said cover member for communicating said cavity to atmosphere, an integral one-piece sealing member bridging said cavity at the bottom of said top member for sealing the reservoir from said cavity and from the atmosphere, said sealing member comprising an annular outer portion squeezed between said cover member and an upper portion of said peripheral reservoir wall, an inner disc-shaped portion, and a flexible annular U-shaped portion, the inner edge of said annular outer portion being spaced from the peripheral edge of said disc-shaped inner portion, said inner edge being approximately the same diameter as the inner surface of said upper portion of said reservoir wall, one leg of said U-shaped portion being connected to said inner edge of said outer portion and the other leg of said U-shaped portion being connected to said peripheral edge of said inner portion, the legs of said U-shaped portion extending in planes transverse to the plane of said inner disc-shaped portion, said one leg extending adjacent to the inner surface of said wall portion of said cover member for substantially the entire length thereof, said other leg being located substantially within said cavity, the combined length of said legs of said U-shaped portion being approximately the same as the depth of the inner surface of said reservoir wall, and means for connecting said cap to said reservoir.

2. The structure as recited in claim 1, wherein said outer portion of said sealing member is generally flat, said cover member has an annular flange portion extending outwardly from and transversely to said wall portion of said cover member, said means for connecting said cap to said reservoir comprises an annular threaded portion of said cover member extending downwardly from and transverse to said flange portion and a complementary threaded portion on the wall of said reservoir, the top surface of said outer portion of said sealing member engages the bottom surface of said flange portion and the bottom surface of said outer portion of said sealing member engages the upper end edge of said reservoir wall.

3. The combination of a split system master cylinder and cap therefor comprising: said master cylinder having a reservoir comprising an outer peripheral wall and an inner wall dividing said reservoir into two fluid chambers, a bore located at the lower end of said reservoir, the axis of said bore being normal to the axis of said chambers, fluid pressure generating means in said bore, first port means communicating one of said chambers with said bore, and second port means communicating the other of said chambers with said bore; said cap comprising a rectangularly shaped cover member having a flat base portion and cavity means extending upwards therefrom, said base portion comprising a flat bottom peripheral surface, breather port means in said cover member for communicating said cavity means to atmosphere, a rectangularly shaped sealing member interposed between said flat bottom peripheral surface of said cover member and the end surface of the walls of said reservoir to seal said reservoir from said cavities and from the atmosphere, said sealing member comprising an outer portion the peripheral edge of which substantially coincides with the peripheral edge of said flat bottom peripheral surface, said outer portion comprising a pair of openings located on opposite sides of said inner wall, a pair of substantially flat inner portions located on opposite sides of said inner wall with the peripheral edge of each of said inner portions being spaced from the edge of its respective opening, and a pair of flexible annular U-shaped portions located on opposite sides of said inner wall, one leg of each of said U-shaped portions being connected to a respective edge of one of said openings and the other leg of each of said U-shaped portions being connected to a respective said peripheral edge of one of said inner portions, the legs of said U-shaped portions extending in planes transverse to the plane of said inner and outer portions and located substantially within said cavity means, the combined length of said legs of a respective one of said U-shaped portions being approximately the same as the depth of the inner surface of the walls of its respective chamber, and means for connecting said cap to said reservoir.

4. The structure as recited in claim 3 wherein said cover member has detents extending downwardly from said base portion thereof through openings in said main base portion of said sealing member to secure said sealing member to said cover member.

References Cited by the Examiner
UNITED STATES PATENTS 2,080,687 5/37 Bowen _____ 60—54.6 X
2,152,485 3/39 Kindl _____ 60—54.6

JULIUS E. WEST, Primary Examiner.
EDGAR W. GEOGHEGAN, Examiner.